(12) United States Patent
Terrell et al.

(10) Patent No.: US 8,561,781 B2
(45) Date of Patent: Oct. 22, 2013

(54) DIVERTER SWING ARM

(75) Inventors: J. Dean Terrell, Louisville, KY (US); Stuart Martin, Louisville, KY (US); Gregory R. Judge, Louisville, KY (US); Brian Charles Evans, Marshfield, MA (US)

(73) Assignees: Santa Rosa Systems, LLC, Louisville, KY (US); Globe Composite Solutions Ltd., Dallas, TX (US)

( * ) Notice: Subject to any disclaimer, the term of this patent is extended or adjusted under 35 U.S.C. 154(b) by 0 days.

(21) Appl. No.: 13/253,667

(22) Filed: Oct. 5, 2011

(65) Prior Publication Data

US 2012/0152694 A1 Jun. 21, 2012

Related U.S. Application Data

(60) Provisional application No. 61/423,394, filed on Dec. 15, 2010.

(51) Int. Cl.
*B65G 47/46* (2006.01)

(52) U.S. Cl.
USPC .................................................. 198/370.07

(58) Field of Classification Search
USPC .................................................. 198/370.07
See application file for complete search history.

(56) References Cited

U.S. PATENT DOCUMENTS

| | | | | |
|---|---|---|---|---|
| 3,768,644 A | * | 10/1973 | Di Frank et al. | 209/559 |
| 4,222,813 A | * | 9/1980 | Jodrey | 156/540 |
| 5,217,104 A | * | 6/1993 | Pelletier | 198/367 |
| 5,244,100 A | * | 9/1993 | Regier et al. | 209/556 |
| 5,452,786 A | | 9/1995 | Gilmore | |
| 5,464,088 A | * | 11/1995 | Koerber | 198/370.07 |
| 5,918,724 A | * | 7/1999 | Terrell et al. | 198/367 |
| 6,220,422 B1 | * | 4/2001 | Lee | 198/370.07 |
| 6,588,575 B1 | * | 7/2003 | Heuft et al. | 198/370.07 |
| 6,822,181 B2 | * | 11/2004 | Linton | 209/524 |
| 6,910,568 B1 | * | 6/2005 | Ydoate et al. | 198/370.07 |
| 7,954,622 B2 | * | 6/2011 | Schimmel et al. | 198/367.1 |
| 7,975,829 B2 | * | 7/2011 | Rogers et al. | 198/457.07 |
| 8,082,838 B2 | * | 12/2011 | Meagher et al. | 92/163 |
| 2007/0209906 A1 | * | 9/2007 | Ranger et al. | 198/370.07 |
| 2010/0193323 A1 | | 8/2010 | Rogers et al. | |

OTHER PUBLICATIONS

ISA/KR, International Search Report and Written Opinion issued for related international application No. PCT/ US2011/065188, mailed Aug. 29, 2012.

* cited by examiner

*Primary Examiner* — Gene Crawford
*Assistant Examiner* — Keith R Campbell
(74) *Attorney, Agent, or Firm* — Stites & Harbison, PLLC; David W. Nagle, Jr.

(57) ABSTRACT

A diverter swing arm for diverting an article from a conveying surface comprises a central body having a unitary construction and including a pusher portion that has an external face for engaging and diverting a particular article from the conveying surface, and a linkage arm that facilitates connection to an actuator, and a pivot pin received in an opening defined by the central body, said pivot pin defining a pivot axis for rotation of the diverter swing arm relative to the conveying surface. There is no molded-in metal skeleton or frame in the diverter swing arm.

7 Claims, 4 Drawing Sheets

DIVERTER SWING ARM

CROSS-REFERENCE TO RELATED APPLICATIONS

The present application claims priority to U.S. Provisional Patent Application Ser. No. 61/423,394 filed on Dec. 15, 2010, the entire disclosure of which is incorporated herein by reference.

BACKGROUND OF THE INVENTION

In conveying and sorting packages, diverter swing arms (also known as diverter blades or paddles) are used to divert an article from a conveying surface onto another conveying surface or some form of discharge chute for further downstream collating and sorting. Diverter swing arms are thus important in sorting articles in an accurate and timely manner.

For example, as shown in FIG. 1, articles (which are generally indicated by reference numeral 100) are traveling along a conveying surface 102. The diverter swing arm 110 is mounted for rotation with respect to the conveying surface 102, so that the diverter swing arm 110 can be selectively rotated by an actuator 112 into the pathway of a particular article to engage and divert that particular article from the conveying surface 102. In the example shown in FIG. 1, the article is diverted onto a discharge chute 104.

Because such diverter swing arms are used where there is a significant volume of articles being conveyed, a common diverter swing arm must often perform a complete cycle (i.e., rotate and engage the article, and then return to a home position) in fractions of a second. For example, in some implementations, the swing arm may cycle at speeds in excess of one-quarter second. At the same time, such diverter swing arms may need to push an article having a weight of up to 70 lbs (or more). Accordingly, it is important that such diverter swing arms be very durable and reliable.

In many cases, such diverter swing arms are made of steel. Such all-metal diverter swing arms often fall victim to metal fatigue, which eventually causes fracture and failure.

U.S. Pat. No. 5,918,724 (which is incorporated herein by reference) describes and claims a diverter blade that includes an inner metallic section (or skeleton) and an outer plastic section. The metallic section is adapted to be connected to a drive motor. As such, the metallic section includes a rotary mounting portion defining an axis of rotation, and at least one torque-transmitting member (i.e., a linkage arm) projecting from the mounting portion. The plastic section is molded over and envelopes the metallic section, and the plastic section includes a front wall that is adapted to engage articles on the conveying surface. However, such a two-material diverter blade still has a metal linkage arm that is prone to metal fatigue, which again eventually causes fracture and failure.

SUMMARY OF THE INVENTION

The present invention is a diverter swing arm that is comprised solely of a polymer material and includes no metal components that would be subject to fatigue and failure.

An exemplary diverter swing arm made in accordance with the present invention includes a central body that has a unitary construction in that it is not an assembly of discrete parts or components, but rather is molded as a single part from a high-strength polymer material. There is no molded-in metal skeleton or frame in the diverter swing arm.

The central body of the diverter swing arm includes a pusher portion that has an external face for engaging and diverting a particular article from a conveying surface. The central body of the diverter swing arm further includes a linkage arm that facilitates connection to a drive motor or other actuator. Again, the pusher portion and the linkage arm are integral parts of the diverter swing arm rather than separate and discrete components. The central body of the diverter swing arm also defines an opening therethrough that receives a metal (steel) pivot pin, but this pivot pin simply defines a pivot axis for the diverter swing arm and does not bear any loads that would subject it to fatigue and failure.

In order to reduce the inertia of the diverter swing arm, multiple recesses may be molded into the pusher portion opposite the external face that engages articles, thus reducing the mass of the diverter swing arm. With respect to the linkage arm, one or more recesses may also be molded into the linkage arm, thus further reducing the mass of the diverter swing arm.

In some exemplary embodiments, the linkage arm terminates in a clevis, which includes upper and lower clevis ears that each define an opening for receiving a connection pin, thus operably connecting an actuator to the diverter swing arm. As a further refinement, each clevis ear may include a molded-in metal eye that prevents premature wear at the points of engagement between the connection pin and the linkage arm.

In order to ensure that the diverter swing arm has sufficient strength and rigidity in the absence of a metal linkage arm or inner metal skeleton, the shape of the diverter swing arm is altered as compared to the prior art. Specifically, the linkage arm of the exemplary diverter swing arm of the present invention has a much wider profile. The linkage arm has a generally triangular shape, increasing in width from its point of engagement with a connection pin (such as the aforementioned clevis ears) to where it connects to the pusher portion. For instance, in some embodiments, the outer (rear) edge of the linkage arm intersects the rear surface of the pusher portion near its midpoint.

DETAILED DESCRIPTION OF THE INVENTION

The present invention is a diverter swing arm that is comprised solely of a polymer material and includes no metal components that would be subject to fatigue and failure.

Figure 1:
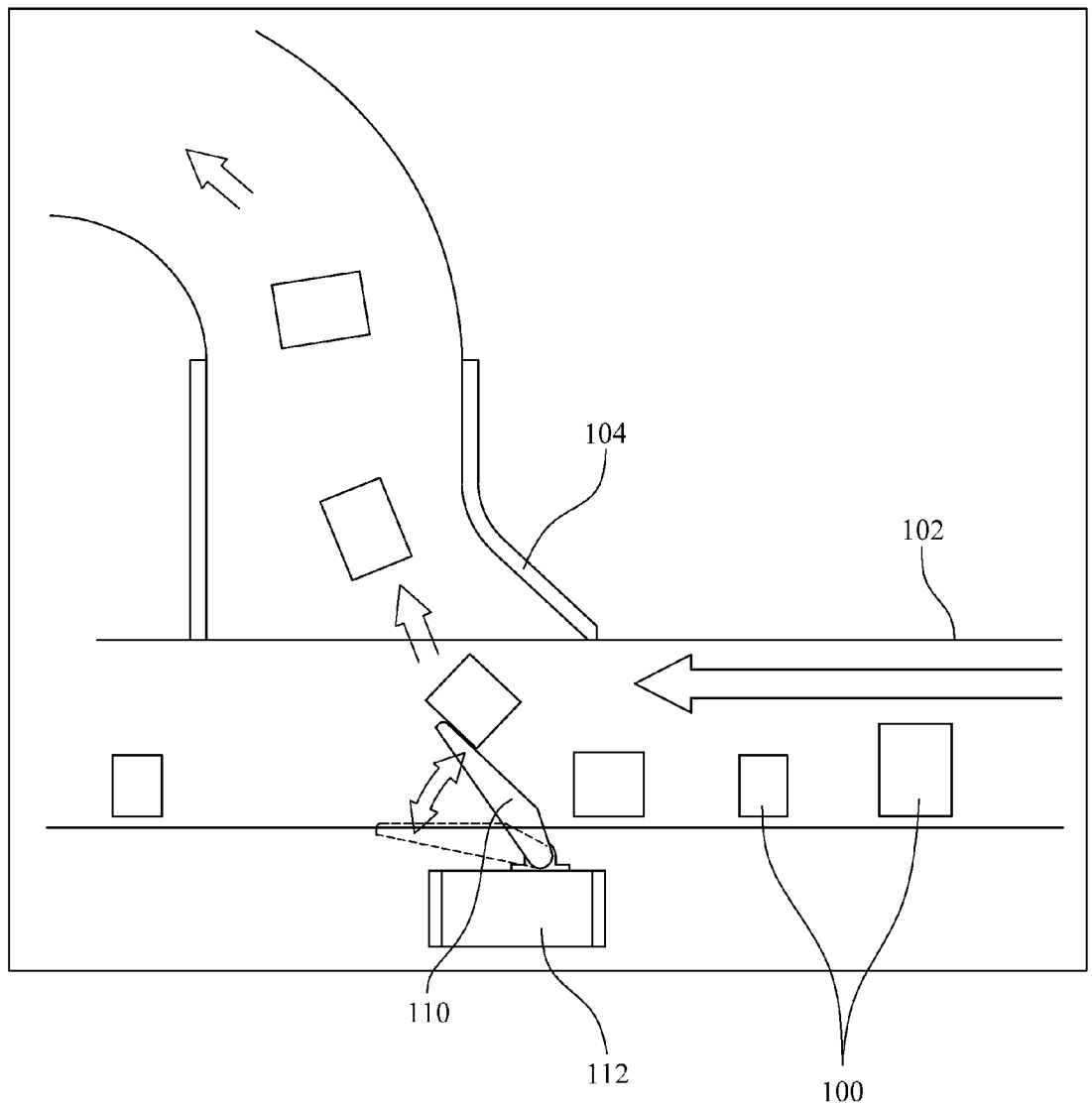
FIG. 1 is a schematic view of a prior art conveying system that includes a diverted swing arm from diverting articles from a conveying surface to a discharge chute.
Figure 2:
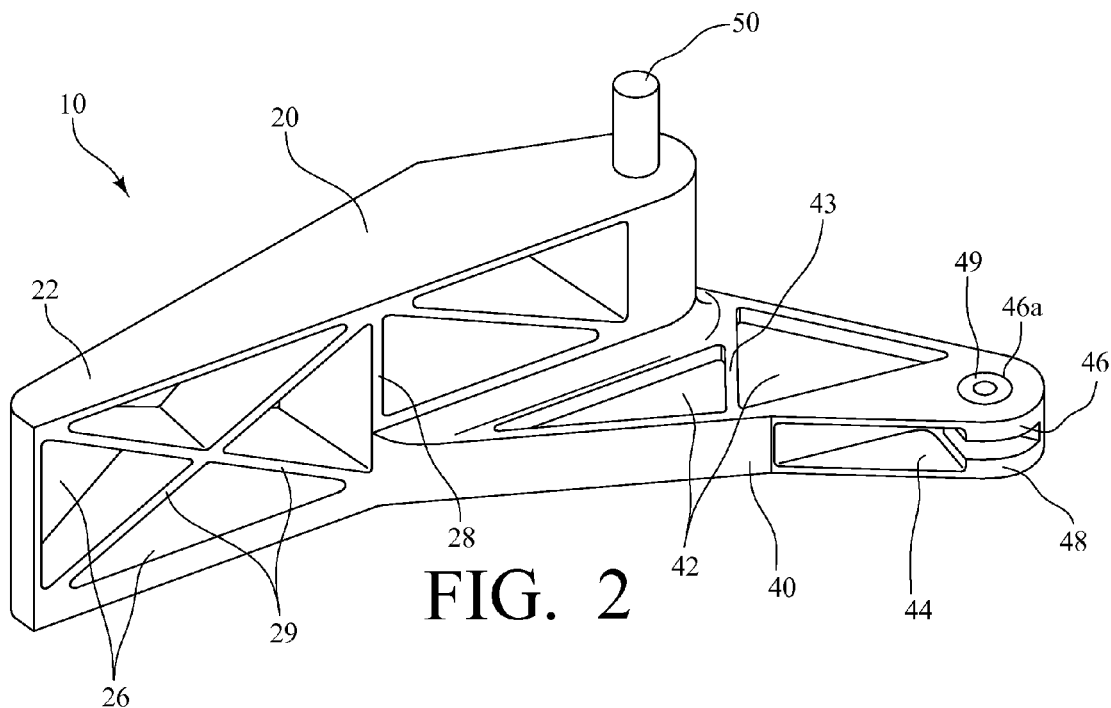
FIG. 2 is a perspective view of an exemplary diverter swing arm made in accordance with the present invention.
Figure 3:
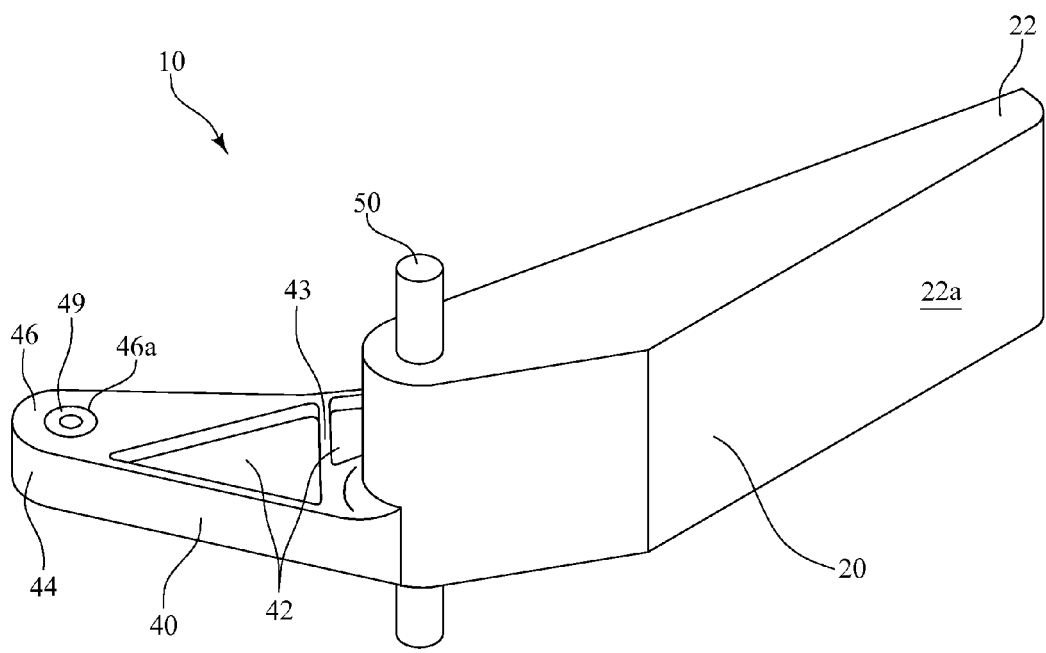
FIG. 3 is an alternate perspective view of the exemplary diverter swing arm of FIG. 2.
Figure 4:
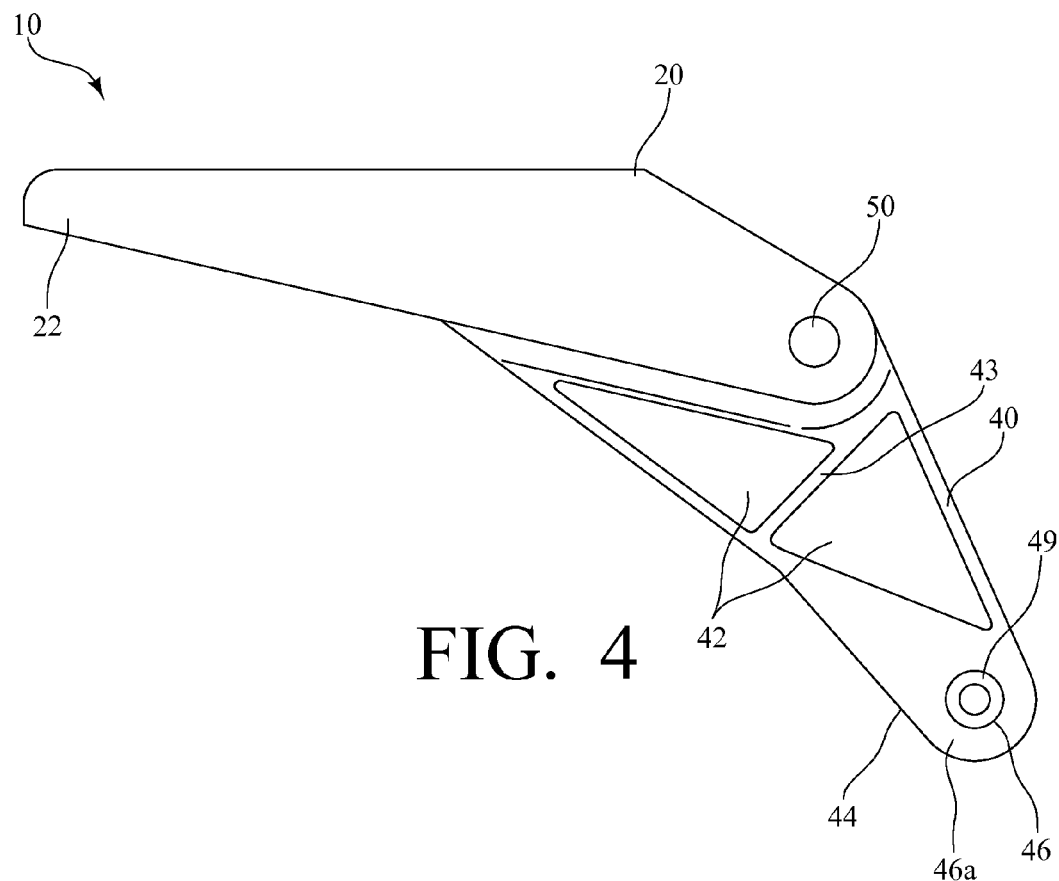
FIG. 4 is a top plan view of the exemplary diverter swing arm of FIG. 2.

FIGS. 2 and 3 are perspective views of an exemplary diverter swing arm 10 made in accordance with the present invention, and FIG. 4 is a top plan view of the exemplary diverter swing arm 10. As shown in FIGS. 2-4, the diverter swing arm 10 includes a central body 20 that has a unitary construction in that it is not an assembly of discrete parts or components, but rather is molded as a single part from a high-strength polymer material. For example, one suitable material for use with the present invention is Brandonite® 1000-75HD, which is a high performance polyurethane product manufactured and distributed by Globe Composite Solutions of Dallas, Tex. (Brandonite® is a registered trademark of Kalm-Forsyth Global Innovations, Ltd. of Dallas, Tex.). There is no molded-in metal skeleton or frame in the diverter swing arm 10.

The central body 20 of the diverter swing arm 10 includes a pusher portion 22 that has an external face 22a for engaging and diverting a particular article from a conveying surface. The central body 20 of the diverter swing arm 10 further includes a linkage arm 40 that facilitates connection to a drive motor or other actuator, as is further described below. Again, the pusher portion 22 and the linkage arm 40 are integral parts of the diverter swing arm 10 rather than separate and discrete components. The central body 20 of the diverter swing arm 10 also defines an opening therethrough that receives a metal (steel) pivot pin 50, but this pivot pin 50 simply defines a pivot axis for the diverter swing arm 10 and does not bear any loads that would subject it to fatigue and failure. With respect to the pivot pin 50, it should also be recognized that the central body 20 of the diverter swing arm 10 could be molded around this pivot pin 50 to effectively make it an integral and permanent part of the diverter swing arm 10.

Furthermore, in order to reduce the inertia of the diverter swing arm 10, multiple recesses 26 are molded into the pusher portion 22 opposite the external face 22a that engages articles, thus reducing the mass of the diverter swing arm 10. At the same time, however, a pattern of upright ribs 28 and/or diagonal braces 29 reinforces and stiffens the pusher portion 22. In this exemplary embodiment and as best shown in FIG. 2, there are six discrete triangular-shaped recesses 26 separated by one upright rib 28 and three diagonal braces 29 (two of which intersect one another).

With respect to the linkage arm 40, one or more recesses 42 are also molded into the linkage arm 40, thus further reducing the mass of the diverter swing arm 10. At the same time, however, one or more ribs 43 may be used to reinforce and stiffen the linkage arm 40. In this exemplary embodiment and as best shown in FIG. 2, there are two discrete triangular-shaped recesses 42 separated by one rib 43.

Perhaps more importantly, the linkage arm 40 terminates in a clevis 44, which includes upper and lower clevis ears 46, 48 that each define an opening 46a (one of which is viewable in FIGS. 2-4) for receiving a connection pin (not shown), thus operably connecting an actuator (not shown) to the diverter swing arm 10. Furthermore, in the exemplary embodiment shown in FIGS. 2-4 as a further refinement, each clevis ear 46, 48 includes a molded-in metal eye 49 that prevents premature wear at the points of engagement between the connection pin (not shown) and the linkage arm 40. Such a construction of the diverter swing arm 10 significantly reduces torsional loading on the linkage arm 40 of the diverter swing arm 10 by providing multiple points of engagement with respect to the connection pin (not shown). Specifically, the linkage arm 40 captures both a top portion of the connection pin and a bottom portion of the connection pin.

Figure 5:
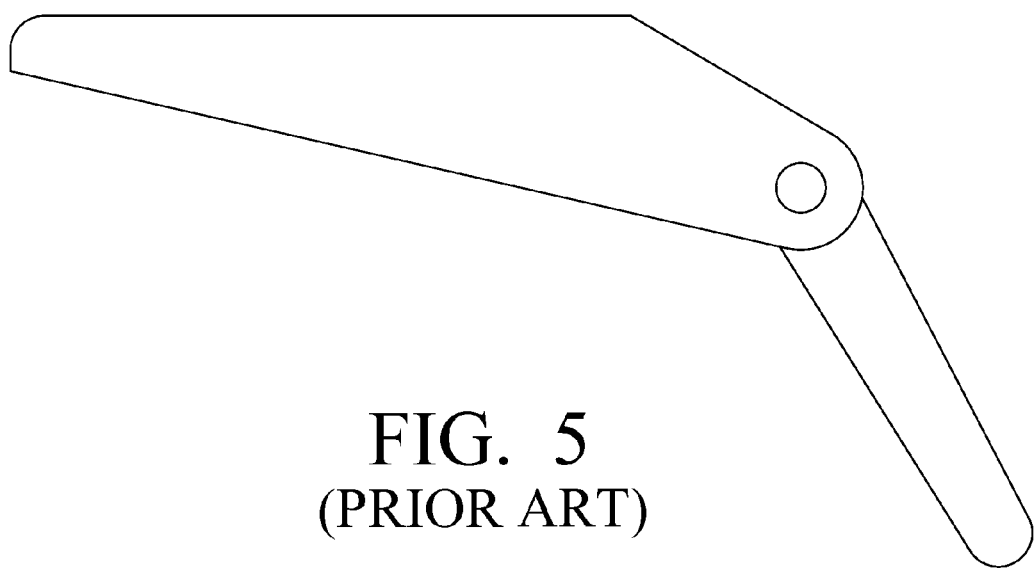
FIG. 5 is a top plan view of a prior art diverter swing arm.

Furthermore, in order to ensure that the diverter swing arm 10 of the present invention has sufficient strength and rigidity in the absence of a metal linkage arm or inner metal skeleton, the shape of the diverter swing arm 10 is altered as compared to the prior art. FIG. 5 is a top plan view of a prior art diverter blade, such as that described in U.S. Pat. No. 5,918,724 for comparison with the top plan view of the diverter swing arm 10 of FIG. 4. As is readily apparent from a comparison of FIG. 5 to FIG. 4, the linkage arm 40 of the exemplary diverter swing arm 10 of the present invention has a much wider profile. The linkage arm 40 has a generally triangular shape, increasing in width from the clevis ears 46, 48 to where it connects to the pusher portion 22. In this regard, and as shown in the top plan view of FIG. 4, the outer (rear) edge of the linkage arm 40 intersects the rear surface of the pusher portion 22 near its midpoint.

Figure 6:
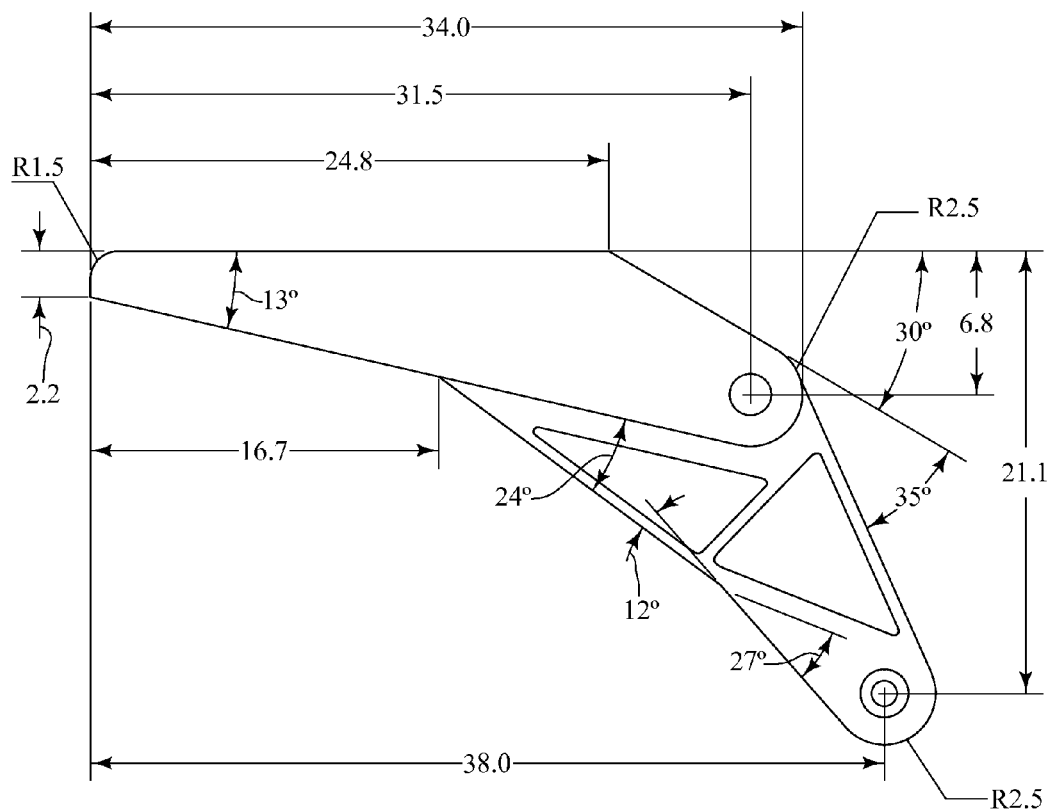
FIG. 6 is a dimensioned top plan view of an exemplary diverter swing arm made in accordance with the present invention.
Figure 7:
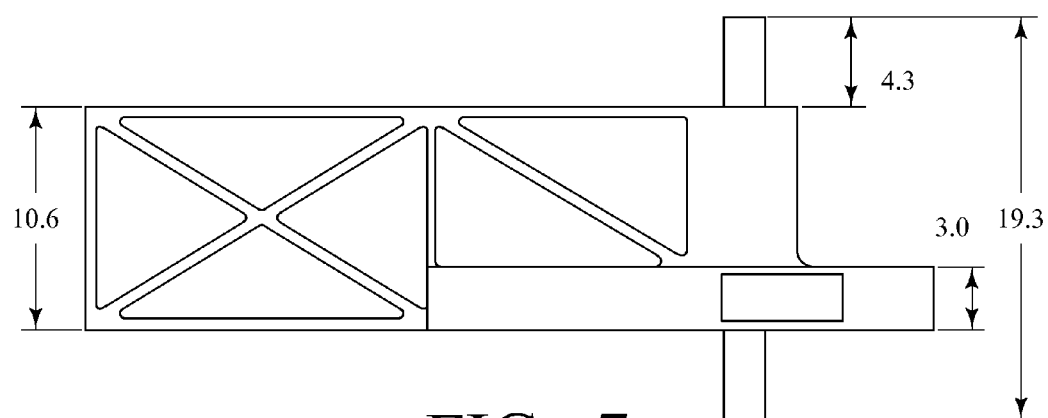
FIG. 7 is a dimensioned side view of the exemplary diverter swing arm of FIG. 6.

Finally, FIGS. 6-7 are similar top plan views of an exemplary diverter swing arm made in accordance with the present invention. FIGS. 6-7 include dimensions, which are not intended to be limiting, but rather are solely for purposes of example.

As reflected in FIG. 6, and consistent with the exemplary embodiment described above with reference to FIGS. 2-4, the outer (rear) edge of the linkage arm intersects the rear surface of the pusher portion near its midpoint. Specifically, the distance between the end of the diverter swing arm and the intersection of the linkage arm with the pusher portion is 16.7 inches, while the overall width of the diverter swing arm is 38.0 inches. As a result, the diverter swing arm of the present invention has sufficient strength to function even though it has a unitary construction molded from a polymer material without any internal skeleton. Furthermore, the mass of the additional material closer to the axis of rotation reduces rotational inertia and allows for a faster diverter swing arm speed, given the same gear motor horsepower and ratio as used in prior art constructions.

As reflected in FIG. 7, and consistent with the exemplary embodiment described above with reference to FIGS. 2-4, the linkage arm also has a substantially increased thickness as compared to prior art constructions. Specifically, the linkage arm has a height of 3.0 inches, while the overall height of the diverter swing arm is 10.6 inches. The increased thickness of the linkage arm provides additional torsional strength to resist twisting of the linkage arm under a load, so that no internal skeleton is necessary. The increased thickness of the linkage arm further allows for the creation of the clevis, which as described above with reference to FIGS. 2-4, significantly reduces torsional loading on the linkage arm by providing multiple points of engagement with respect to a connection pin.

One of ordinary skill in the art will recognize that additional embodiments are possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A diverter swing arm for diverting articles from a conveying surface, comprising:
a central body having a unitary construction and including a pusher portion that has an external face for engaging and diverting a particular article from the conveying surface, and a linkage arm that facilitates connection to an actuator; and
a pivot pin received in an opening defined by the central body, said pivot pin defining a pivot axis for rotation of the diverter swing arm relative to the conveying surface;
wherein the linkage arm terminates in a clevis, which includes upper and lower clevis ears that each define an opening for receiving a connection pin for operably connecting the linkage arm to the actuator;

wherein the linkage arm has a generally triangular shape, increasing in width from the clevis ears to where the linkage arm connects to the pusher portion; and wherein a rear edge of the linkage arm intersects a rear surface of the pusher portion substantially at a midpoint along the rear surface of the pusher portion.

2. The diverter swing arm as recited in claim 1, wherein the central body is molded from a polymer material.

3. The diverter swing arm as recited in claim 1, wherein the pusher portion of the central body includes multiple recesses positioned opposite the external face.

4. The diverter swing arm as recited in claim 3, in which each of the multiple recesses has a triangular shape.

5. The diverter swing arm as recited in claim 3, wherein the multiple recesses are separated by a combination of one or more upright ribs and one or more diagonal braces.

6. A diverter swing arm for diverting articles from a conveying surface, comprising:
   a central body molded from a polymer material and having no internal skeleton, said central body including a pusher portion that has an external face for engaging and diverting a particular article from the conveying surface, and a linkage arm that facilitates connection to an actuator; and
   a pivot pin received in an opening defined by the central body, said pivot pin defining a pivot axis for rotation of the diverter swing arm relative to the conveying surface;
   wherein the linkage arm terminates in a clevis, which includes upper and lower clevis ears that each define an opening for receiving a connection pin for operably connecting the linkage arm to the actuator;
   wherein the linkage arm has a generally triangular shape, increasing in width from the clevis ears to where the linkage arm connects to the pusher portion; and
   wherein a rear edge of the linkage arm intersects a rear surface of the pusher portion substantially at a midpoint along the rear surface of the pusher portion.

7. A diverter swing arm for diverting articles from a conveying surface, comprising:
   a central body having a unitary construction and including a pusher portion that has an external face for engaging and diverting a particular article from the conveying surface, and a linkage arm that facilitates connection to an actuator; and
   a pivot pin received in an opening defined by the central body, said pivot pin defining a pivot axis for rotation of the diverter swing arm relative to the conveying surface;
   wherein the linkage arm defines one or more openings at a terminal end for receiving a connection pin for operably connecting the linkage arm to the actuator;
   wherein the linkage arm has a generally triangular shape, increasing in width from the terminal end to where the linkage arm connects to the pusher portion; and
   wherein a rear edge of the linkage arm intersects a rear surface of the pusher portion substantially at a midpoint along the rear surface of the pusher portion.

* * * * *